United States Patent Office 3,443,931
Patented May 13, 1969

3,443,931
PROCESS FOR MAKING METALLIZED PELLETS FROM IRON OXIDE CONTAINING MATERIAL
Donald Beggs, Toledo, Ohio, and William A. Ahrendt, Lambertville, Mich., assignors to Midland-Ross Corporation, Toledo, Ohio, a corporation of Ohio
Filed Sept. 10, 1965, Ser. No. 486,345
Int. Cl. C21b 13/14
U.S. Cl. 75—33                                    3 Claims

ABSTRACT OF THE DISCLOSURE

This invention is concerned with a method of metallizing compacts of iron oxide containing a carbonaceous material. The compacts are formed, dried, and pre-indurated up to a temperature between 1600–1800° F. The pellets are then rapidly heated by exposure to a radiant heat source which produces an environment at a temperature between 2300–2600° F. for a sufficient time so that a liquidous phase is formed within the compacts. After the liquidous phase is formed, the compacts tend to shrink and then are immediately chilled by exposure to a cold environment.

This invention relates to an improved process for making metallized or pre-reduced pellets, suitable for use in blast furnaces or steel making furnaces, from iron oxide containing materials. This invention further relates to the producing of metallized or pre-reduced pellets having physical and metallurgical properties which are superior for use in the steel industries in large quantities. This invention relates more specifically to an improved process for making metallized pellets having improved properties, by utilizing what is referred to in the art as "heat-fast" technology, wherein a pellet of iron ore and internal carbonaceous material is metallized in a matter of a few minutes total processing time.

In order for a pellet to be useful to the steel industry, it must have structural properties that allow it to withstand rough handling in bulk quantities, for example, when being loaded into an ore boat or unloaded therefrom and stockpiled. In addition, the pellet must have good properties for withstanding weathering in a stockpile for extended periods of time without the chemical, physical, or metallurgical properties of the pellet being changed appreciably by the weather. Furthermore, a pellet ought to have as high a density as is practical to obtain, in order that a charge of such pellets in a blast furnace will contain the maximum number of iron units per cubic foot of volume. The only methods known to the inventors which will produce pellets satisfying the aforesaid requirements are those using "heat-fast" technology involving relatively high temperatures and short cycle periods as described in U.S. Patent 2,793,109 issued May 21, 1957 to Huebler and Beggs. The Huebler-Beggs patent covers a method for reducing iron oxides contained in an agglomerated mass which includes carbon, and the process consists of heating the agglomerated mass in a direct fired furnace atmosphere substantially devoid of free oxygen to a temperature upwards of 2200° F. in a matter of minutes. One of the key features of the Huebler-Beggs process is to heat the agglomerated mass very quickly in order that gases which are generated by the mass will protect the same from the effects of the surrounding furnace atmosphere, thus enabling a direct fired furnace to be employed.

The Huebler-Beggs process is primarily concerned with metallizing an agglomerated mass such as a pellet or a briquette, in order to accomplish metallization per se. Through a comprehensive period of experimentation it was found that the Huebler-Beggs process works very well in accomplishing metallization per se; however, it was learned that certain improvements to the original Huebler-Beggs process are necessary in order to produce a metallized pellet which will more fully meet the requirements of the steel industry for use in a blast furnace or a steel making furnace.

It is, therefore, an object of this invention to provide a process for metallizing compacts containing iron oxides and carbonaceous material whereby high density pellets are obtained.

It is another object of this invention to provide sintered metallized pellets having a relatively high density.

It is still another object of this invention to provide a process for producing metallized pellets which are able to withstand exposure to the elements without having substantial change in their chemical, physical, and metallurgical properties.

It is a further object of this invention to provide a process wherein metallized pellets are produced from compacts containing iron oxides and sulphurous carbonaceous material wherein an appreciable portion of the sulphur is eliminated in the pellets.

It is a still further object of this invention to provide a metallized pellet containing a vitrified network of iron oxide and silica.

An improvement process of metallizing compacts composed of iron oxide has been discovered which produces metallized pellets satisfying the heretofore mentioned objects, which process will now be described briefly.

Green compacts of iron ore concentrate are made from a mixture which contains the iron ore, 10–20% carbonaceous material, water, and a suitable binder. The compacts are first dried at a temperature preferably below 600° F., which drying step is included to avoid exfoliation which may be occasioned by drying the compacts too quickly at too high a temperature. The dried pellets are then fed one to two layers deep onto the surface of a furnace hearth and are heated by exposing the same to a source of radiant heat at a temperature of 1800° F. to 2200° F. As used herein, the term "exposing to a heat source" means that the pellets are within such close proximity of the heat source that any appreciable change in the temperature of the source will immediately result in a temperature change in the pellets, and if exposed sufficiently long, the pellets will attain a temperature substantially equal to that of the source. The pellets are exposed to the heat source at a temperature of 1800° F. to 2200° F. for a period of one to three minutes, which step is referred to as a pre-heat step, at which time volatiles of the iron ore and carbonaceous materials are driven out of the pellet. The pellets are next exposed for a period of 4–12 minutes to a second source of radiant heat at a temperature between 2300 to 2600° F. in an atmosphere substantially devoid of free oxygen and containing less than 10% combustibles. During this second heating stage the pellets are metallized, i.e., a reaction occurs wherein free iron is formed and CO and $CO_2$ are liberated. The metallization process is an endothermic reaction; therefore, the temperature of the source of heat is somewhat higher than the temperature at which this endothermic reaction occurs. More specifically, even though the source of heat is between 2300 to 2600° F., the temperature of the pellets remains somewhat lower, since part of the heat received by the compacts is expended in carrying out the endothermic reaction. After sufficient time has passed for the compacts to metallize, they remain exposed to a source of heat at 2300 to 2600° F., but the atmosphere is changed by increasing the amount of combustibles in excess of 10%. The compacts are exposed to the latter environment for a period of one to three minutes, during which time an incipient liquid phase of iron-oxide and silica is formed, and an appreciable amount of shrinkage occurs in the pellets. After the shrinkage occurs, the pellets are frozen by exposing them to a heat sink such as a chill plate.

The experimental work has been done primarily with high grade iron ore concentrates, such as are being produced and utilized today for making oxide pellets for blast furnaces; however, the process is equally applicable to other iron oxide containing materials such as fume from oxygen blown vessels, fume from open hearth furnaces, blast furnace flue dust, or some of the direct shipping iron ore materials which are found in various parts of the world. The work has also been directed primarily toward the utilization of relatively low cost carbonaceous reductants, such as raw Pocahontas coal or lignite, since the cost of the carbonaceous reductant becomes extremely important when projecting the manufacture of metallized pellets in large tonnages. Again, the improvements are equally applicable to other forms of carbonaceous reductant such as anthracite coal, metallurgical coke, or petroleum coke. More specifically, two different iron ore concentrates were used, one being a concentrate containing mostly magnetite with some hematite and approximately 4% silica, the other being mostly magnetite with very little hematite and about 7–8% silica. Utilized for the carbonaceous reductant was raw Pocahontas coal fines of the grade which is commonly used as a part of the feed material for steel plant coke ovens.

The experimental work has been directed to making two degrees of metallized pellets, namely 60% metallized and 90%+ metallized. As a matter of definition, in a 60% metallized pellet, 60% of the total iron units occur as metallic iron. Likewise, in a 90% metallized pellet, 90% of the iron units occur as metallic iron. The reason for investigating not only 90% metallization, but also 60% metallization, is that a blast furnace charge need not necessarily be the higher metallization as this would tend to make the blast furnace operate too much like a cupola. On the other hand, with the higher metallization a blast furnace charge could very well be a blend of highly metallized pellets and conventional oxide pellets for optimum blast furnace efficiency. Regardless of the desired degree of metallization, the process of this invention applies equally well to a wide range of metallization.

This process has been perfected through the use of ½ inch diameter and ⅞ inch diameter balls made either in a balling drum or in a balling disk. The process applies equally well, however, to briquettes or other forms of compacts.

The first step of the metallizing process is to make suitable green balls. To this end, raw Pocahontas coal, ground to an overage fineness of approximately 200 mesh, and a small amount of bentonite were added to an iron ore concentrate which had a fineness of approximately 75 to 80% minus 325 mesh. Sufficient water was added to this mixture for proper balling. For an iron ore concentrate containing approximately 95% iron oxide, the amount of Pocahontas coal required per 100 pounds of dry concentrate is approximately 14.5–16.8 pounds for 60% metallization, and 21 to 23 pounds for 90% metallization.

The second step of this process is to dry the green balls in a conventional manner to avoid exfoliation due to drying too rapidly and also to avoid oxidizing or burning any appreciable amount of the coal which is contained within the ball. The drying step is preferably accomplished in a perforated conveyor type furnace where the balls are loaded to a depth of six to eighteen inches, and the drying is accomplished by forced circulation of heated air or gases. In the drying step, care must be taken not to let the dried balls reach a temperature above 600° F. if free oxygen is present in the drying gases. Both magnetite concentrate and Pocahontas coal have an apparent "ignition" point of approximately 650° F.

After the balls are dried, the next step is that of preheating. In the pre-heat step, the dried balls are preferably heated to a temperature of 1600 to 1800° F. in a period of one to three minutes by subjecting the dried pellets to heat from a radiant heat source having a temperature in the range of approximately 1800° F. to 2200° F. During the pre-heat step, volatiles in the coal are driven out of the pellet and other volatiles, such as carbon dioxide, present in the iron ore concentrate or in the coal are also driven off. During the pre-heat step, the pellet, in effect, is devolatized and calcined. It has been found that this pre-heat step ought to be carried out very rapidly in order to simultaneously accomplish a number of things, as follows: First, the rapid devolatizing results, in an appreciable desulphurization of the coal or other form of carbon. Sulphur volatiles are permitted to escape from the pellet before any actual metallization occurs to any appreciable extent, which metallization would inhibit desulphurization. Second, the rapid evolution of volatiles issuing from the pellets protects the same from the furnace atmosphere gases. Thus, the surrounding furnace atmosphere which is used to generate the radiant heat source is not critical. The furnace atmosphere is preferably products of combustion which enables the employment of a direct fired furnace. During the pre-heat step, the furnace atmosphere surrounding the pellets can contain some combustibles or may contain some free oxygen. At this stage of the process the atmosphere is not critical because of the protection given to the individual pellets by the volatiles being generated within the pellets at a rapid rate. A third reason for the pre-heat step is to condition the pellet for subsequent rapid metallization by getting all of the ingredients within the pellet up to a temperature close to that where rapid metallizing reactions will occur, but without actually superimposing the volatiles liberated during metallization on the volatiles which are thermally driven out of the pellet during the pre-heat step.

The fourth step of the process is the metallization step which is preferably carried out in a period of four to twelve minutes in order to make the pellets insensitive to the surrounding furnace atmosphere and permit the use of an atmosphere oxidizing to iron, but which is substantially devoid of free oxygen as described in the Huebler-Beggs patent. For rapid metallization, the pellet must be rapidly heated to a temperature of 2000 to 2100° F. It has been found that with a pellet which has been preheated to a temperature of 1600 to 1800° F. as in step three above, the metallization step can be accomplished by subjecting the pellet to a radiant heat source at a temperature of 2300 to 2600° F. and "rose petaling" or other undesirable forms of exfoliation will not be encountered. During such fast metallization, the carbon within the pellets reacts very rapidly to reduce iron oxide to metallic iron, with liberation of considerable quantities of carbon monoxide and carbon dioxide. This type of metallizing reaction is highly endothermic, and tends to hold the pellet temperature down to approximately 2100° F. even though the radiant heat source is at 2300 to 2600° F. The furnace atmosphere during such rapid metallization is not critical, thus permitting the use of a direct fired furnace with products of combustion as the atmosphere for the metallization step.

The fifth step involves pellet shrinkage or pellet sintering. Immediately following the metallization step, the pellet is rapidly heated to a temperature of approximately 2200 to 2300° F. in a period of one to three minutes by subjecting the pellet to radiant heat from a furnace at a temperature of 2300 to 2600° F. Once the pellet has been substantially metallized during the metallization step, the amount of residual carbon is relatively low, and the endothermic reaction becomes very minor or non-existent, thus enabling the pellet to respond very rapidly to furnace temperature and attain a temperature which approaches furnace temperature. During the shrinkage step, a ⅞ inch diameter pellet will shrink to approximately ⅝ inch in diameter in a very short period of time. This rapid shrinkage is believed to be due to a combination of the formation of an incipient eutectic liquid phase between residual wustite and silica, which occurs above 2150° F., and a sintering action which tends to agglomerate metallic iron particles. As the carbon reacts during metallization, a considerable amount of void is created within the pellet; thus, before shrinkage, the pellet is exceedingly porous. During the shrinkage or sintering step, the pellets reach a semi-plastic state. It has been found that during the shrinkage step, the pellets must remain undisturbed on a furnace hearth as they are too plastic to be physically handled or moved. In order for the pellets to retain their shape during the shrinkage or sintering step, it has also been found that the maximum permissible depth of pellets on a furnace hearth is approximately two layers.

The furnace atmosphere during the shrinkage step is more critical than is the case during the preheat step and during the metallization step, since for all practical purposes there are no longer any volatiles issuing from the pellet. During the shrinkage or sintering step, the furnace atmosphere may be products of combustion, but the combustibles content of such products of combustion should be preferably in the range of 10–30% total combustibles (CO+hydrogen). Maintaining a furnace temperature of 2300 to 2600° F. with this amount of combustibles requires either the use of preheated air or oxygen enrichment to the combustion air in order to use a direct fired furnace.

The shrinkage or sintering step is very important to the properties of the finished metallized pellet. The shrinkage or sintering produces a pellet with a very high resistance to abrasion that is capable of withstanding rough handling and stockpiling. The shrinking or sintering greatly increases the bulk density of the pellets, which is a desirable feature for the blast furnace. Metallized pellets with a bulk density as high as 145 pounds per cubic foot have been readily produced. The shrinkage or sintering step also provides for excellent weathering properties of the pellet. All signs of pyrophoricity are eliminated, i.e., the pellet is very effectively passivated. It is not known whether the incipient liquid phase which forms during the shrinkage step, due to residual wustite reacting with silica and other gangue constituents, or the sintering action of the metallic iron particles provides the good resistance to reoxidation when exposed to the weather in a stockpile.

Step six in this metallizing process is a fast chill step wherein the very hot plastic pellets are quickly chilled to a temperature in the order of 2000 to 2100° F. or lower, preferably by exposing the shrunken or sintered pellets to a water-cooled heat sink. An adequate chill to enable the pellets to be physically handled and to be no longer in the plastic state can be accomplished in ten to 15 seconds by permitting the pellets to radiate to such a water-cooled heat sink. The chill serves to freeze any incipient liquid phase as well as to make agglomerated metallic iron particles stronger. After such ten to fifteen second chill period, the hot metallized pellets may be readily pushed, scraped, or otherwise conveyed off a hearth into any suitable cooling device or, if so desired, into a water quench tank. The furnace atmosphere during the fast chill step is not critical since the time period is so short.

Figure 1:
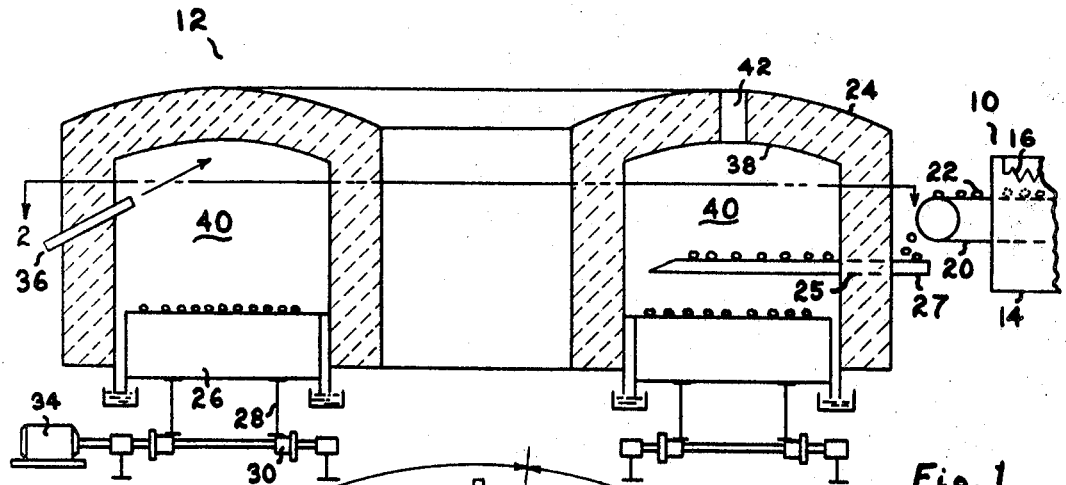
FIG. 1 is a partially schematic and partially cross-sectional view of a conveyor furnace and a rotary hearth furnace.

Referring now to the drawing, a conveyor furnace for drying green pellets is shown generally at 10, and a rotary hearth furnace for metallizing the pellets is shown generally at 12. The conveyor furnace 10 comprises a furnace housing 14 and a source of heat 16, which source may be of any conventional means, such as electric resistors, gas burners, or spent hot gases leaving the metallizing furnace, capable of attaining a temperature up to 600° F. The green pellets 22, which may be made through the method previously described, are placed upon a rotating belt 20 and are conveyed into the furnace housing 14, thereby becoming exposed to tthe heat source 16 and dried by the same. After the pellets are dried, they emerge from the furnace 10 and are then processed through the rotary hearth furnace 12.

The rotary hearth furnace 12 has a furnace enclosure 24 having an opening 25 therein. The opening 25 receives a vibrator feeder 27 which serves as means for loading the dried pellets 22 into the hearth furnace.

Disposed within the furnace enclosure 24 is an annular hearth 26, which hearth is made from a suitable refractory material. Attached to the bottom of the hearth 26 are a pair of circular rails 28. The rails 28 are supported on wheeled members 30 driven by any conventional driving means, e.g., by an electric motor as indicated at 34, thereby providing means for rotating the hearth 26 relative to the enclosure 24.

Disposed about the furnace 12 and inserted within the outside wall of the enclosure 24 are a plurality of burners 36 and air injection pipes 48. The burners 36 are inclined at a slight angle and are directed toward the roof 38 of the enclosure 24, thereby impinging directly upon the same. In this way, the burners 36 heat the roof 38 and cause it to emit radiant heat. Disposed within the roof 38 is a flue 42, which flue passes through the enclosure 24, thereby communicating the space 40 defined by the roof 38 and the hearth 26 with the atmosphere.

Located within the hearth furnace 12, within close proximity of the opening 25, is a chill plate 44, which chill plate is a water cooled metallic body having a surface exposure immediately above the hearth 26. Intermediate the chill plate 44 and the opening 25 is a means for removing the pellets 22 from the hearth 26 as, for example, a water cooled helical screw 46.

Figure 2:
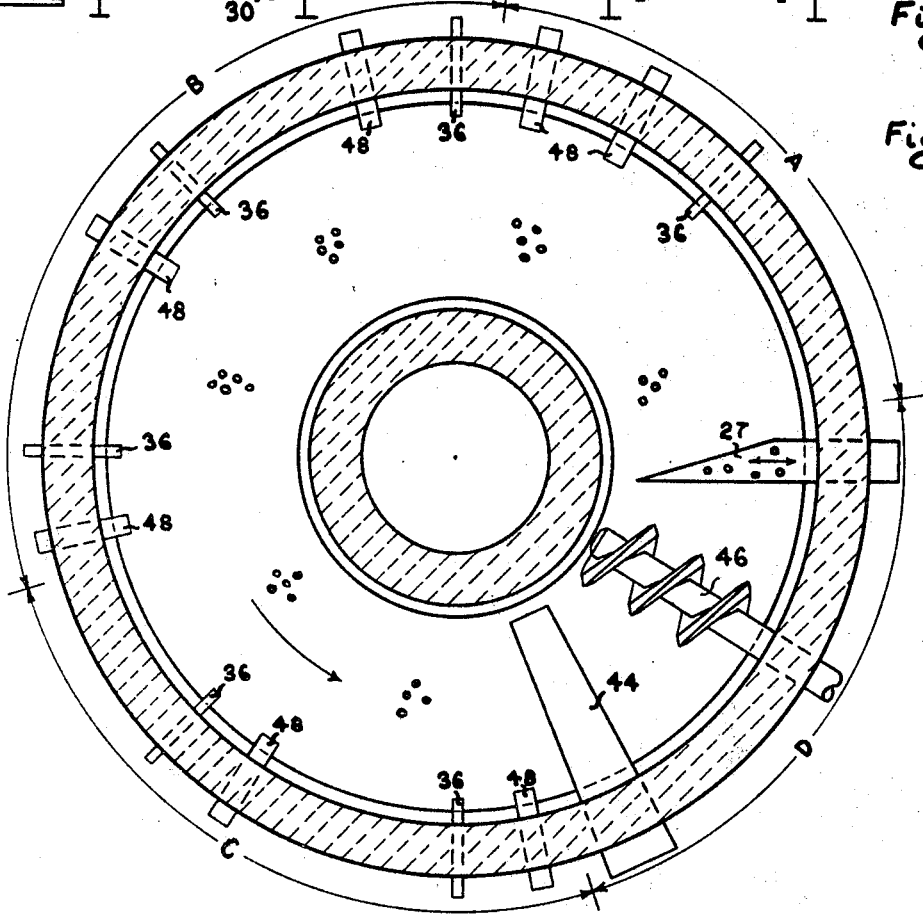
FIG. 2 is a cross-sectional view of the rotary hearth furnace taken along the line 2—2 of FIG. 1.

The hearth 26, as shown in FIG. 2, is driven in counterclockwise rotation by the driving means 34. The hearth furnace 12 is separated into four different zones indicated A, B, C, and D. As tthe hearth 26 is rotated, each portion thereof has a residence time within each zone, the time being determined by the rate of rotation. Within each of the zones, the temperature and the atmosphere may be controlled, in part, by the burners 36 and/or by the air injection pipes 48. After the pellets 22 are dried, they are placed upon the hearth 26 by the vibrator 27 one to two layers deep, so that each pellet may have good exposure to the radiatnt heat being emitted from the roof 38. As the hearth 26 rotates in a counterclockwise direction, the pellets 22 are carried through the first zone. In the first zone the burners 36 heat the portion of the roof 38 in zone A to a temperature of 1800° to 2200° F., the preferred temperature being approximately 2050° F. The atmosphere of this zone is not critical as the volatiles are removed from the iron oxide and the carbonaceous material which comprise the pellet and serve as a protective atmosphere from oxidation; however, it is preferable that the atmosphere be composed of the products of combustion with less than 5% combustibles. The rate of rotation of the hearth is adjusted so that the pellets are in the first zone for a period of one to three minutes per inch of compact thickness.

In the second zone, indicated by "B," the burners 36 heat the roof 38 of the enclosure 24 to a temperature between 2300° F. and 2600° F., the preferable temperature being approximately 2550° F. During this time, the pellets 22 are going through an endothermic reaction whereby metallic iron is being formed and CO and $CO_2$ are being given off. The CO and $CO_2$ issuing from the pellets 22 protects the pellets from the atmosphere in the furnace; thus the atmosphere may be oxidizing to iron as when it contains 1–10% combustibles, and a portion of the CO issuing from the pellets may be burned to supply heat. The reaction which is taking place in the pellets 22 is an endothermic reaction, and the temperature of the pellets themselves will be substantially below the temperature of the hearth roof 38. The pellets 22 are kept in zone 2 for a period of four to twelve minutes per inch of compact thickness so that metallization of the pellets will be complete. After the pellets 22 are metallized and the endothermic reaction is substantially complete, the pellets then enter the third zone shown at "C."

In this third zone the roof 38 of the hearth is maintained at 2300 to 2600° F., the preferable temperature being 2500° F.; however, inasmuch as the endothermic reaction is substantially complete, the temperature of the pellets will increase greatly.

The furnace gases are directed counter to the direction of rotation of the hearth. Zone 3 of the furnace, which is the pellet shrinkage or sintering zone, is equipped with conventional direct fired burners adapted to burn with oxygen enriched or pre-heated air in order to have wide latitude over the combustibles concentration of the products of combustion as well as the zone temperature. Zone 2 is equipped with conventional direct fired burners as well as with separate air injection pipes 48 located approximately 18 inches above the elevation of the hearth. These air pipes 48 are provided to burn the excess combustibles flowing from zones 3 into zone 2, as well as to burn carbon monoxide which would issue from the pellets during metallization. Zone 1 of the furnace is also equipped with air injection pipes similar to those of zone 2, and for the same purpose.

The atmosphere in the third zone, when using pre-heated air, is maintained with preferably 10–30% combustibles. When using oxygen enriched air, the percentage of preferred combustibles will be higher, depending upon the degree of enrichment. During this period, the pellets are going through a liquid phase and are also shrinking so that an increase in density results. After the shrinkage is complete, the pellets 22 are "frozen" by subjecting the same to the chill plate 44 as they enter the fourth zone indicated at "D." Subjection of the pellets 22 to the chill plate 44 reduces the temperature quickly and substantially below the liquid phase temperature so that by the time the pellets 22 are engaged by the helical screw 46, they are able to be handled rather readily without any deformation of their shape and without their sticking to one another.

We claim:

1. A process for producing metallized pellets from dry compacts composed of iron oxide and carbonaceous material, comprising feeding said compacts one to two layers deep onto a hearth, removing substantially all the volatiles from said compacts by exposing the same to an environment at 1800 to 2200° F. for a period of one to three minutes per inch of compact thickness, converting said compacts into metallized pellets by exposing the same to a radiant heat source which produces an environment having a temperature between 2300 and 2600° F. for a period of four to twelve minutes per inch thickness, creating a liquid phase in said pellets by directly exposing the same to a radiant heat source which produces an environment having a temperature between 2300 and 2600° F. for a period of one to three minutes per inch of thickness and rapidly reducing the temperature of said pellets to solidify said liquid phase by exposing said pellets to a heat sink while said pellets are disposed on said hearth.

2. A process for making metallized pellets from compacts composed of iron oxide, carbonaceous material and water; comprising drying said compacts to remove a substantial portion of said water; charging said compacts onto a furnace hearth one to two layers thick; exposing said charged compacts to a first environment at 1800 to 2200° F., having an atmosphere substantially devoid of free oxygen, comprising mainly products of combustion and less than 5% combustibles, exposing said compacts to said first environment for one to three minutes per inch of compact thickness; exposing said compacts to a second environment at 2300 to 2600° F. having an atmosphere comprising mainly the products of combustion and less than 10% combustibles, which environment is substantially devoid of free oxygen, subjecting said compacts to said second environment for a period of four to twelve minutes per inch thickness of compact to convert said compacts into metallized pellets; directly exposing substantially all of said pellets to a radiant heat source which produces a third environment having a temperature of 2300 to 2600° F., said third environment further comprising an atmosphere substantially devoid of free oxygen and products of combustion greater than 10% combustibles for a period of one to three minutes per inch of compact thickness; and rapidly chilling said pellets by exposing all of said pellets directly to a radiation heat sink having a temperature substantially below the temperature of the pellets.

3. A process for making metallized pellets from compacts of iron oxide, carbonaceous material and water; comprising drying said compacts to remove a substantial portion of said water, exposing said compacts to a first environment at 1800 to 2200° F. having an atmosphere substantially devoid of free oxygen which comprises mainly products of combustion and less than 5% combustibles, exposing said compacts to said first environment for one to three minutes per inch of compact thickness; exposing said compacts to a second environment of at least 2300° F. having an atmosphere comprising mainly the products of combustion and less than 10% combustibles, which environment is substantially devoid of free oxygen, subjecting said compacts to said second environment for a period of four to twelve minutes per inch of compact thickness; directly exposing substantially all of said compacts to a radiant source which produces a third environment having a temperature of between 2300 to 2600° F., comprising an atmosphere substantially devoid of free oxygen and products of combustion with greater than 10% combustibles for a period of one to three minutes per inch of compact thickness, and rapidly chilling said compacts by exposing substantially all of said compacts directly to a radiation heat sink having a temperature substantially below the temperature of said compacts.

References Cited

UNITED STATES PATENTS

| | | | |
|---|---|---|---|
| 1,868,952 | 7/1932 | Simpson | 75—33 |
| 2,072,072 | 2/1937 | Hartgen | 75—36 X |
| 2,085,625 | 6/1937 | Andersen | 75—36 X |
| 2,146,625 | 2/1939 | Christiansen | 75—36 |
| 3,083,090 | 3/1963 | Davies | 75—33 X |
| 3,218,152 | 11/1965 | Sasabe | 75—29 X |
| 3,264,091 | 8/1966 | Ban | 75—33 X |
| 3,264,092 | 8/1966 | Ban | 75—3 X |
| 3,317,308 | 5/1967 | Greffe | 75—34 X |
| 3,333,951 | 8/1967 | Ban | 75—3 |

OTHER REFERENCES

Tsukerman, Powder Metallurgy, Pergamon Press; 1965, page 67.

Classification Definitions—U.S. Patent Office, Class 75–200.

L. DEWAYNE RUTLEDGE, *Primary Examiner.*

HENRY W. TARRING II, *Assistant Examiner.*

U.S. Cl. X.R.

75—3, 36, 44